Patented Dec. 27, 1949

2,492,193

UNITED STATES PATENT OFFICE 2,492,193

CHEMICAL COMPOUNDS AND PROCESS OF PREPARING THE SAME

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,765

6 Claims. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ4,5-3,11,20-triketo-17(β), 21-hydroxy pregnene. This application is a divisional of copending application Serial No. 605,194, filed July 14, 1945, now abandoned.

This hormone is known to occur naturally in the adrenal cortex; it has the structural formula:

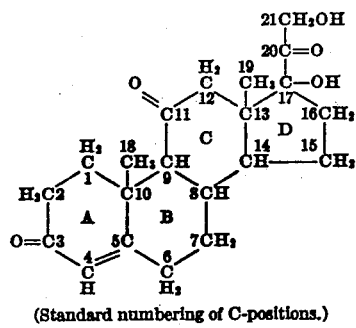

(Standard numbering of C-positions.)

This formula, for purposes of convenience, is hereinafter reproduced below in the abbreviated form:

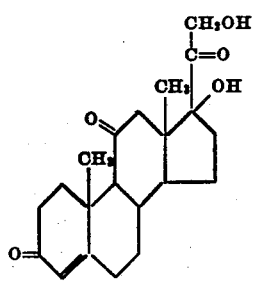

In the following description of the invention, the stereochemical relationships of substituents are indicated by the following conventions:

1. A substituent at the C-3 position which is trans to the C-10 methyl group is parenthetically designated (α).

2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

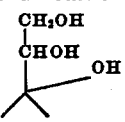

in the latter case above the side chain, thus

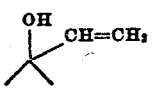

3. The stereochemical relationship of rings A and B is indicated in the formulae by a solid line representing the valence bond in the cis configuration.

In accordance with the present invention it is now found this hormone can be synthesized by reactions indicated as follows:

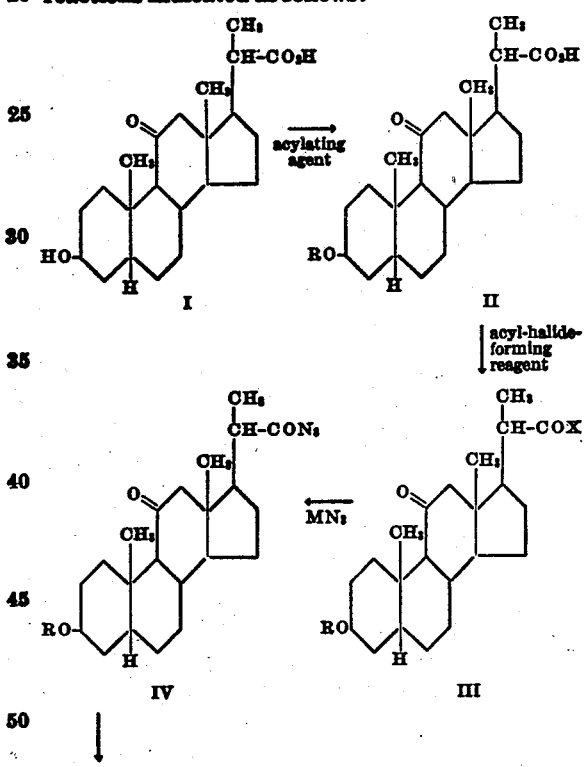

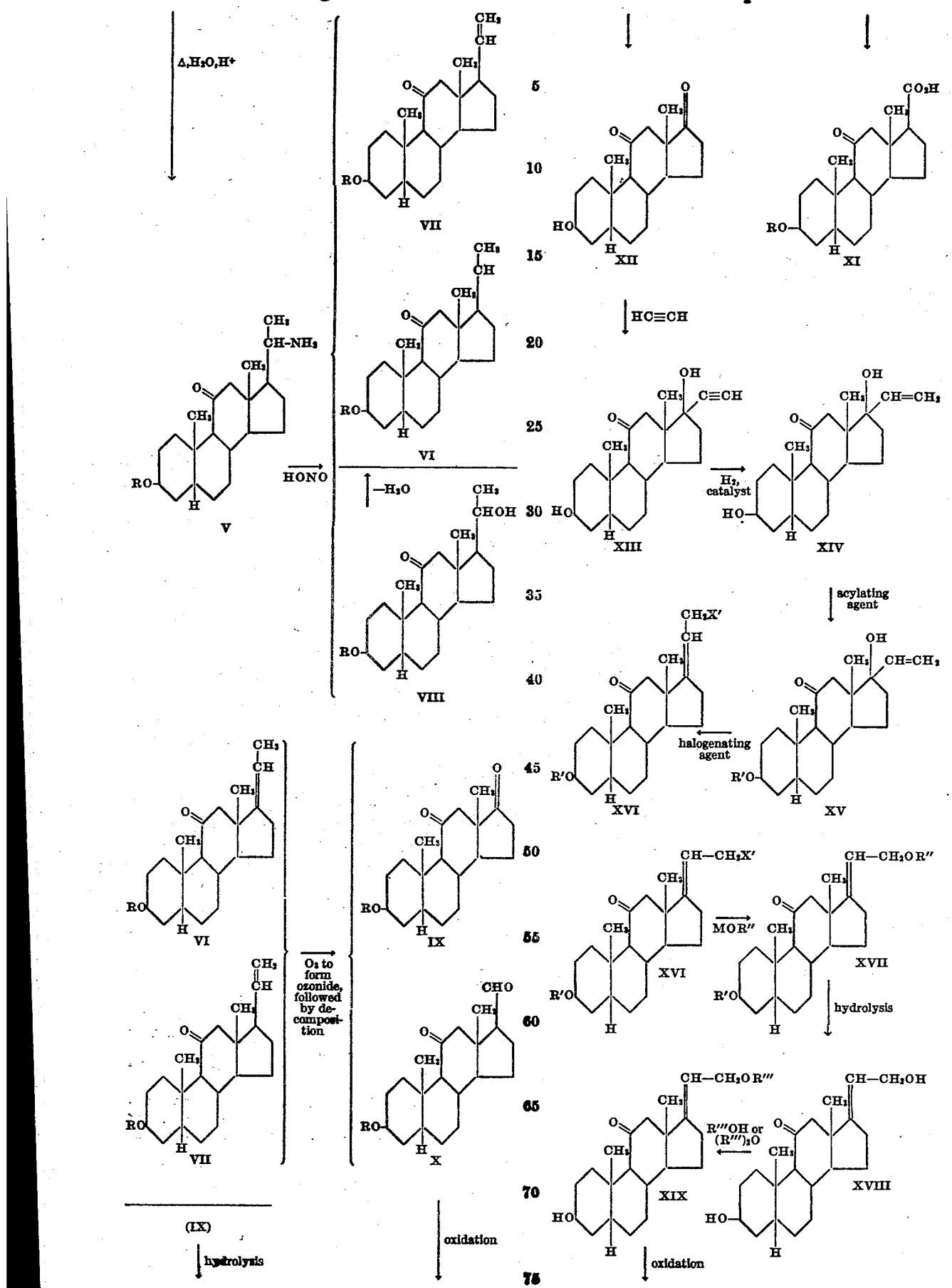

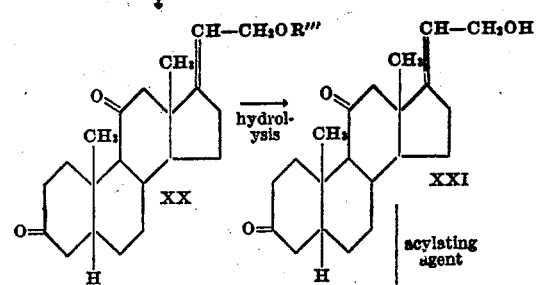
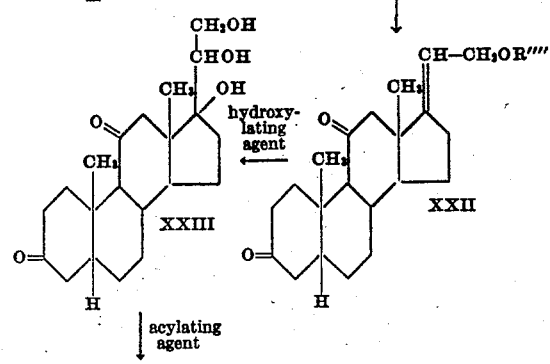
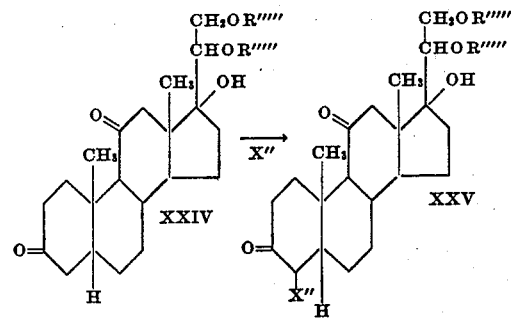
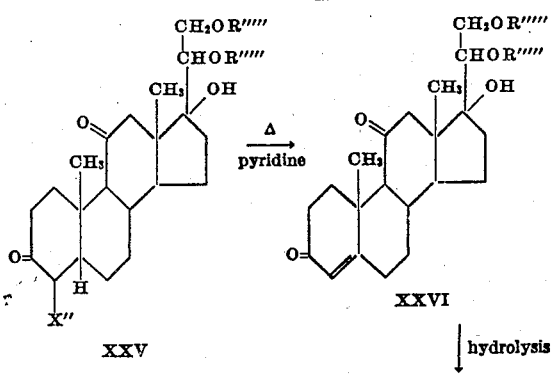
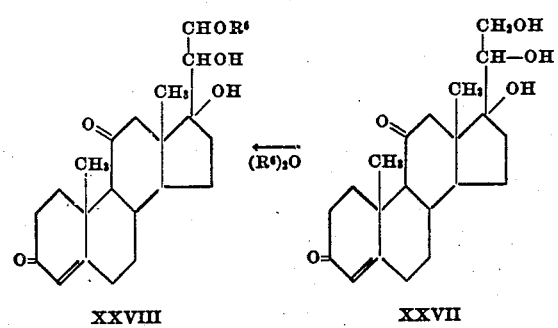

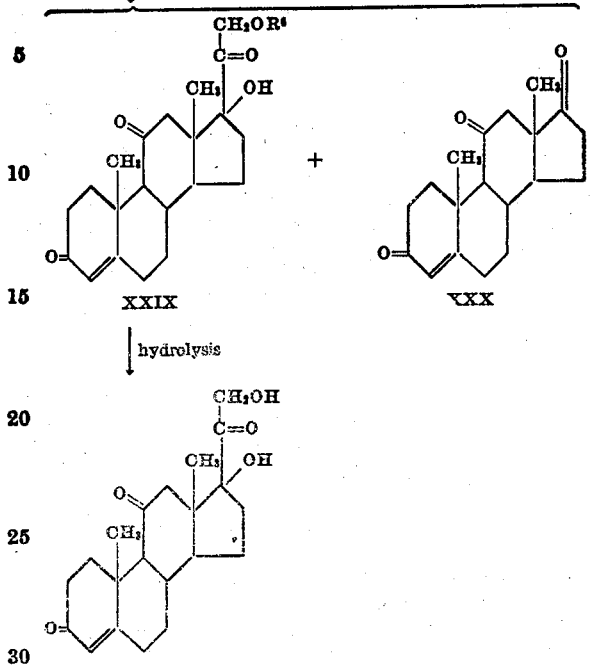

In the above formulae, R, R', R'', R''', R'''', R''''', and R⁶ are acyl; X, X' and X'' are halogen; and M is an alkali metal or an alkaline earth metal /2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposion of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiocholane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy-11-ketopregnene (XIV)

which is acylated to form Δ²⁰,²¹-3-acyloxy-17-hydroxy-11-ketopregnene (XV), and this compound is halogenated to produce Δ¹⁷,²⁰-3-acyloxy-11-keto-21-halo-pregnene (XVI). When treated with an alkali metal salt or alkaline earth metal salt of an organic acid, this compound yields Δ¹⁷,²⁰-3,21-diacyloxy - 11 - ketopregnene (XVII) which is hydrolyzed producing Δ¹⁷,²⁰-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of Δ¹⁷,²⁰-3,11-diketo-21-acyloxy-pregnene (XX). This product (XX) is hydrolyzed and the Δ¹⁷,²⁰-3,11-diketo - 21 - hydroxypregnene (XXI) thus formed is acylated producing Δ¹⁷,²⁰-3,11-diketo-21-acyloxypregnene (XXII). Hydroxylation at the unsaturation of the last mentioned compound (XXII) results in the production of 3,11 - diketo - 17(β), 20,21-trihydroxypregnene (XXIII) which is then acylated to form 3,11-diketo-17(β) - hydroxy-20,21 - diacyloxypregnene (XXIV). When brominated, this compound yields 3,11-diketo-4-bromo-17(β)-hydroxy-20,21-diacyloxypregnene (XXV).

This compound is then treated with a reagent capable of removing the elements of hydrogen bromide, thereby producing Δ⁴,⁵-3,11-diketo-17(β)-hydroxy-20,21-diacyloxypregnene (XXVI) which on hydrolysis forms Δ⁴,⁵-3,11-diketo-17(β),20,21-trihydroxypregnene (XXVII). Partial acylation of this compound (XXVII) gives Δ⁴,⁵-3,11-diketo-17(β),20-dihydroxy - 21-acyloxypregnene (XXVIII) which, when oxidized, yields a mixture of Δ⁴,⁵-3,11,20-triketo-17(β)-hydroxy-21-acyloxypregnene (XXIX) and Δ⁴,⁵-3,11,17-triketo androstene (XXX). Compounds (XXIX) and (XXX) may be separated by conventional operations, for example chromotography, and compound (XXIX) hydrolyzed to produce the desired adrenal hormone, Δ⁴,⁵-3,11,20-triketo-17(β),21-dihydroxypregnene.

This invention is concerned with compounds of the type represented by intermediates 20, 21 and 22 above, and with processes of producing same. Intermediate 20 may be represented by the formula:

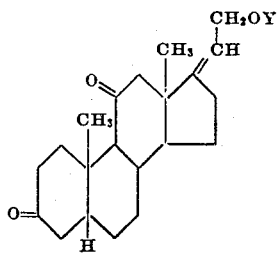

in which Y is an oxidation-resistant group which can readily be converted to a hydroxy group; and intermediates 21 and 22 may be represented by the formula:

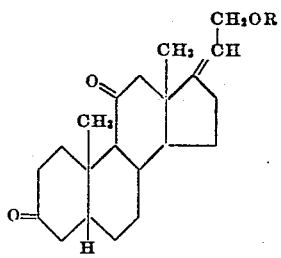

in which R is acyl or hydrogen.

The starting material employed in the process according to this invention, Δ¹⁷,²⁰-3-hydroxy-11-keto-21-acyloxypregnene or the 3-acyloxy derivative thereof, may be obtained as described in copending application Serial No. 649,764, filed February 23, 1946.

In accordance with this invention, an ester having the basic structural formula:

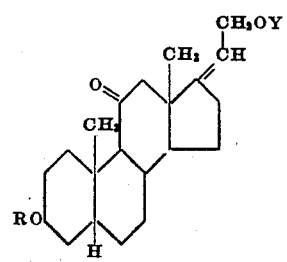

in which R is acyl or hydrogen and Y is an oxidation-resistant group which can readily be converted to a hydroxy group, for example, an acyl group; is subjected to oxidation whereby the 3-substituent is converted to a keto group. The acyl group R above may be widely varied, for example, it may be the acyl radical of acetic, propionic, butyric, valeric, caproic, capric, benzoic, toluic, or phenylacetic acid, of which the lower aliphatic acids, i. e. those having 6 carbon atoms or less, are preferred. The ester used as the starting material can be produced by esterifying Δ¹⁷,²⁰-3,21 - dihydroxy-11-ketopregnene with an aliphatic or aromatic monobasic or dibasic acid or anhydride such as succinic, phthalic, or benzoic acid, or succinic, acetic or phthalic anhydride. Preferably, a dibasic acid anhydride such as succinic acid anhydride is employed; when succinic acid anhydride is employed, the hemisuccinate (Y=—CO.CH₂.CH₂.CO₂H) is formed.

As the oxidizing agent chromium trioxide, chromic acid, a chromate salt in an acid medium or aluminum phenoxide in acetone can be used. The oxidation should be carried out in dilute solution, e. g. 1 gram of oxidizing agent per 100 cc. of solution, at temperatures of the order of 15° C., i. e. at or below usual room temperature, using a slight excess of the oxidizing agent above the stoichiometric amount required to oxidize the substituent in the three position. Under the above reaction conditions, it is found that conversion to the keto compound occurs with high yields of the compound having the following structural formula:

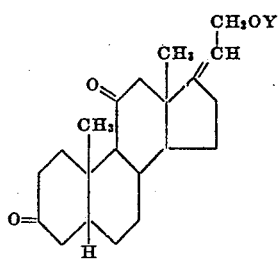

Y being as above defined.

In further practice of this invention, this keto compound is saponified to convert the 21 position substituent to a hydroxy group and then this compound is acylated, using an organic acid or acid anhydride hereinabove mentioned, preferably acetic anhydride, to give the corresponding 21-acyloxy derivative having the structural formula:

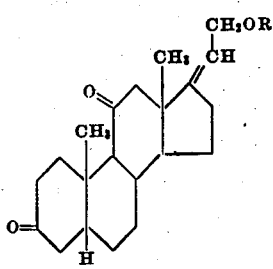

R being acyl.

In the following example, oxidation of the 21-hemisuccinate to convert the 3-hydroxyl group to a keto group, followed by the saponification and acetylation of the resultant keto compound is described, but it will be understood this example is only for purposes of illustration and this invention is not limited thereto.

Example

A solution of 138 mg. of $\Delta^{17,20}$-3-($\alpha$)-hydroxy-11-keto-21-hemisuccinoxypregnene in 14 cc. of glacial acetic acid at 12° C. was treated dropwise with 65 mg. chromic acid in a mixture of 1.3 cc. of water and 1.3 cc. of glacial acetic acid. The temperature was permitted to rise to 17° C. over a period of 45 minutes, the excess chromic acid was then destroyed with dilute sodium sulfite, the solution concentrated in vacuo, diluted with water and extracted with ether. The washed ethereal extract was concentrated to dryness producing a non-crystalline residue consisting of $\Delta^{17,20}$-3,11-diketo-21-hemisuccinoxypregnene is about 80% yield.

The ester was then saponified by heating with 10% aqueous potassium carbonate on the steam bath. The neutral product so obtained was taken up in ether, washed, concentrated and crystallized from ethyl acetate-pentane. $\Delta^{17,20}$-3,11-diketo-21-hydroxypregnene was obtained in practically 100% yield; it had a melting point of 150°–151° C.

To a mixture of 5 cc. of pyridine and 5 cc. of acetic anhydride was added 845 mg. of the diketohydroxypregnene. The solution was permitted to stand overnight and was then diluted with water. The ethereal layer was washed successively with dilute hydrochloric acid, dilute potassium carbonate and water, then concentrated to dryness on a steam bath giving about 100% yield of $\Delta^{17,20}$-3,11-diketo-21-acetoxypregnene as a colorless glass.

While in the example the starting material used was a compound having the 3-hydroxy group in the trans form, a compound having this group in the cis form also may be used as the steric configuration of the group in the 3 position is not important.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example, as the proportions, unless otherwise indicated, are not critical, although enough of the reagents should be employed to insure substantially complete reaction to produce the desired products.

Since certain changes in carrying out the above process, and certain modifications in the intermediates which embody the invention, may be made without departing from the scope of the invention, it is intended that all matter contained in the above description shall be interpreted in an illustrative and not in a limiting sense.

What is claimed is:
1. $\Delta^{17,20}$-3,11-diketo-21-hemisuccinoxypregnene.
2. $\Delta^{17,20}$-3,11-diketo-21-hydroxypregnene.
3. $\Delta^{17,20}$-3,11-diketo-21-acetoxypregnene.
4. The process that comprises oxidizing a compound of the basic formula:

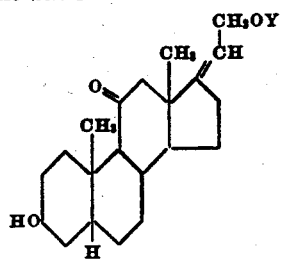

in which Y is a lower aliphatic acyl radical selected from the group consisting of monocarboxylic and dicarboxylic acid radicals, with a reagent selected from the group consisting of chromium trioxide, chromic acid, chromate salt in an acid medium and aluminum phenoxide in acetone, to produce the corresponding 3-keto compound, saponifying this compound, and then acylating the product to obtain the corresponding $\Delta^{17,20}$-3,11-diketo-21-lower aliphatic acyloxy compound.

5. The process that comprises oxidizing a compound of the basic formula:

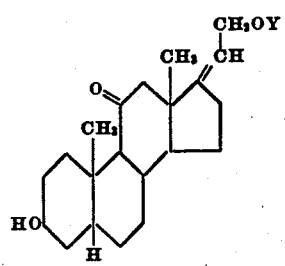

in which Y is a lower aliphatic acyl radical selected from the group consisting of monocarboxylic and dicarboxylic acid radicals, with a reagent selected from the group consisting of chromium trioxide, chromic acid, chromate salt in an acid medium and aluminum phenoxide in acetone, to produce the corresponding 3-keto compound, and saponifying this compound to obtain a compound of the formula:

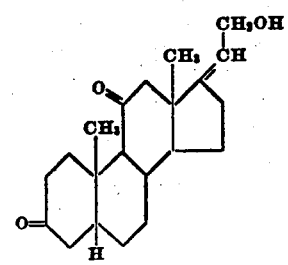

6. The process that comprises reacting $\Delta^{17,20}$-3-hydroxy-11-keto-21-hemisuccinoxypregnene with chromium trioxide and recovering $\Delta^{17,20}$-3,11-diketo-21-hemisuccinoxypregene.

LEWIS H. SARETT.

REFERENCES CITED

The following references are of record in the file of this patent:

UNITED STATES PATENTS

| Number | Name | Date |
|---|---|---|
| 2,094,045 | Schoeller | Sept. 28, 1937 |
| 2,184,299 | Hildebrandt | Dec. 26, 1939 |
| 2,188,330 | Bockmuhl | Jan. 30, 1940 |
| 2,239,012 | Miescher | Apr. 22, 1941 |
| 2,254,562 | Bockmuhl | Sept. 2, 1941 |
| 2,265,143 | Butenandt | Dec. 9, 1941 |